(12) United States Patent
Fang et al.

(10) Patent No.: US 10,291,380 B2
(45) Date of Patent: May 14, 2019

(54) FULL DUPLEX OPERATION IN A WIRELESS NETWORK

(71) Applicants: ZTE Corporation, Shenzhen (CN); ZTE (USA) Inc., Austin, TX (US)

(72) Inventors: Yonggang Fang, San Diego, CA (US); Li Zhang, Shenzhen (CN); Bo Sun, Shenzhen (CN); Kaiying Lv, Shenzhen (CN); Nan Li, Shenzhen (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 113 days.

(21) Appl. No.: 15/236,330

(22) Filed: Aug. 12, 2016

(65) Prior Publication Data

US 2017/0078076 A1    Mar. 16, 2017

Related U.S. Application Data

(62) Division of application No. 14/330,803, filed on Jul. 14, 2014, now Pat. No. 9,419,777.

(30) Foreign Application Priority Data

Jul. 15, 2013 (WO) ................. PCT/CN2013/079401

(51) Int. Cl.
*H04L 5/14* (2006.01)
*H04J 11/00* (2006.01)
(Continued)

(52) U.S. Cl.
CPC ............ *H04L 5/14* (2013.01); *H04J 11/0023* (2013.01); *H04L 12/413* (2013.01);
(Continued)

(58) Field of Classification Search
None
See application file for complete search history.

(56) References Cited

U.S. PATENT DOCUMENTS

| 7,860,133 B2 | 12/2010 | Salter et al. |
| 2002/0071448 A1 | 6/2002 | Cervello et al. |

(Continued)

FOREIGN PATENT DOCUMENTS

| CN | 101137229 A | 3/2008 |
| CN | 102355507 A | 2/2012 |
| WO | 2013/179270 A1 | 12/2013 |

OTHER PUBLICATIONS

He, F., et al., "A Study on Self-jammer Cancellation in Passive RFID System," Modern Radar, 35(5):67-75, May 2013 (no translation available).

(Continued)

*Primary Examiner* — Brian S Roberts
(74) *Attorney, Agent, or Firm* — Perkins Coie LLP

(57) ABSTRACT

Multiple wireless devices in a network perform full duplex communication in which the transmission path and receiving path are spatially separated to allow simultaneous transmission and receiving. The wireless devices can either be controlled using a centralized, or point, coordination function or a distributed coordination function. A full-duplex wireless device senses the medium during transmission by itself and selectively continues the transmission when a signal is sensed on the medium. A full-duplex wireless device measures signal being transmitted by its transmitter and estimates parameters that can be used to cancel the contribution of the locally transmitted signal to the locally received signal concurrently being received during the transmission. The transmit antenna and the receive antenna of a full-duplex wireless device can be configured to be spatially isolated from each other to minimize interference between the antenna functions.

6 Claims, 24 Drawing Sheets

(51) Int. Cl.
  *H04L 12/413* (2006.01)
  *H04W 76/00* (2018.01)
  *H04W 74/08* (2009.01)
  *H04W 74/00* (2009.01)
  *H04W 84/12* (2009.01)

(52) U.S. Cl.
  CPC ....... *H04W 74/0808* (2013.01); *H04W 76/00* (2013.01); *H04W 74/002* (2013.01); *H04W 84/12* (2013.01)

(56) References Cited

U.S. PATENT DOCUMENTS

| | | |
|---|---|---|
| 2003/0198238 A1 | 10/2003 | Westby |
| 2005/0058151 A1 | 3/2005 | Yeh |
| 2005/0141545 A1* | 6/2005 | Fein .................... H04B 7/0617 370/445 |
| 2007/0274297 A1 | 11/2007 | Cross, Jr. et al. |
| 2008/0147923 A1 | 6/2008 | Renahy et al. |
| 2009/0086706 A1 | 4/2009 | Huang et al. |
| 2011/0310834 A1 | 12/2011 | Seok |
| 2012/0051338 A1* | 3/2012 | Seok ................. H04W 74/0816 370/337 |
| 2013/0208708 A1* | 8/2013 | Nezou .................. H04W 74/08 370/336 |
| 2014/0016516 A1 | 1/2014 | Aggarwal et al. |
| 2014/0078940 A1 | 3/2014 | Aggarwal et al. |
| 2014/0169233 A1 | 6/2014 | Aggarwal et al. |
| 2014/0195366 A1 | 7/2014 | McKnight et al. |
| 2014/0237585 A1 | 8/2014 | Khan et al. |
| 2015/0172038 A1 | 6/2015 | Jiang et al. |
| 2016/0128097 A1 | 5/2016 | Pajukoski et al. |

OTHER PUBLICATIONS

Sahai, A., et al., "Pushing the limits of Full-duplex: Design and Real-time Implementation," eprint arXiv:1107.0607, pp. 1-12, Jul. 2011.
Chinese Office Action dated Mar. 1, 2017 for Chinese Application No. 201410337262.7, filed Jul. 15, 2014, no translation available (15 pages).
Chinese Office Action dated Oct. 23, 2017 for Chinese Application No. 201410776054.7, filed Dec. 15, 2014, no translation available (8 pages).

* cited by examiner

FULL DUPLEX OPERATION IN A WIRELESS NETWORK

CROSS REFERENCE TO RELATED APPLICATIONS

This patent document is a divisional application of U.S. application Ser. No. 14/330,803, filed on Jul. 14, 2014, which claims the benefit of priority under 35 U.S.C. § 119(a) and the Paris Convention of International Patent Application No. PCT/CN2013/079401, filed on Jul. 15, 2013. The entire contents of the before-mentioned patent applications are incorporated by reference as part of the disclosure of this document.

TECHNICAL FIELD

This patent document relates to wireless communication.

BACKGROUND

Wireless communication systems can include a network of one or more access points (AP) to communicate with one or more wireless stations (STA). An access point can emit radio signals that carry management information, control information or users' data to one or more wireless stations, and a station can also transmit radio signals to the access point in the same frequency channel via time division duplexing (TDD) or in different frequency via frequency division duplexing (FDD).

IEEE 802.11 is an asynchronous time division duplexing technology designated for wireless local area network (WLAN). The basic unit of WLAN is a basic service set (BSS). An infrastructure BSS is the BSS with stations through associating with an Access Point (AP) to connect to the wired network or Internet. In a BSS, both access point and stations share the same frequency channel via using CSMA/CA technology, a kind of TDD mechanism, for multiple access and data transmission.

SUMMARY

This document describes technologies, among other things, for using full-duplex transmission to improve the medium usage efficiency and/or to reduce transmission latency.

In one aspect, a technique is provided to combine CSMA/CA mechanism with Collision Early Detection and Avoidance (CEDA) for channel access from multiple stations and full-duplex simultaneous DL and UL transmission in TXOP.

In another aspect, a method of CEDA is provided for using full-duplexer to detect and avoid collision in early stage. Once the collision is detected, transmitting stations would fast release the medium for new contention.

In yet another aspect, a method is provided for full-duplexer to cancel self-interference using dual-layer antenna arrays for better cancellation performance.

In yet another aspect, a method is provided for full-duplexer to calibrate radio parameters for RF and digital cancellation algorithms using the preamble as training sequence during the station's contending the medium.

In addition, in yet another aspect, a method of calibrating radio parameters for RF and digital cancellation algorithms is provided for the responding station to calibrate full-duplexer using the preamble in the response to the medium request.

In yet another aspect, a method is provided for a full-duplex AP station to schedule multiple pairs of DL and UL simultaneous transmissions. In another aspect, a method is provided to operate the full-duplex AP station to control and schedule simplified simultaneous transmission and receiving (STR) for two half duplex stations, which could reduce the design and implementation complexity of full-duplex on non-AP stations and provide more flexibility to real deployment.

In another aspect, a method is provided to use full-duplex transmission mechanism to mitigate the issue of hidden nodes in WLAN deployment.

In another aspect, a method is provided for using full-duplex transmission mechanism in relay station to fast forward received packets to the next hop station to reduce the transmission latency.

The details of the above, and other, aspects and their implementations are set forth in the accompanying drawings, the description and the claims.

DETAILED DESCRIPTION

This document describes techniques, mechanisms, devices, and systems for, among other things, multiple access with full-duplex for simultaneous downlink (DL) and uplink (UL) transmission over single frequency channel in wireless communications.

In existing wireless transmission systems, access to a transmission medium is typically based on a half duplex transmission link even when the communication systems emulate full duplex communications via Time Division Duplexing (TDD) or Frequency Division Duplexing (FDD). In a half-duplex system operating on a single frequency channel, two communicating stations do not transmit downlink and uplink signals at same time over the same frequency channel because the transmitting signal could significantly interfere the receiver and make the receiver not work properly. Therefore, the current wireless communication systems typically separate out the transmitting signal from receiving signal either in different frequency (FDD) or in different time (TDD) so that the receiver would not be interfered by the transmitting signals.

In FDD system, the DL and UL radio frequencies have to be separated enough for analog or digital filters to suppress the out-band inference to a certain level. For TDD system, the DL and UL transmissions have to be separated in the time domain, i.e. two communicating stations transmit signal alternately without overlapping in the time domain. Therefore in either FDD or TDD system, the radio spectrum cannot be fully utilized. In TDD system, the more switching times between DL and UL transmissions, the less medium utilization efficiency.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
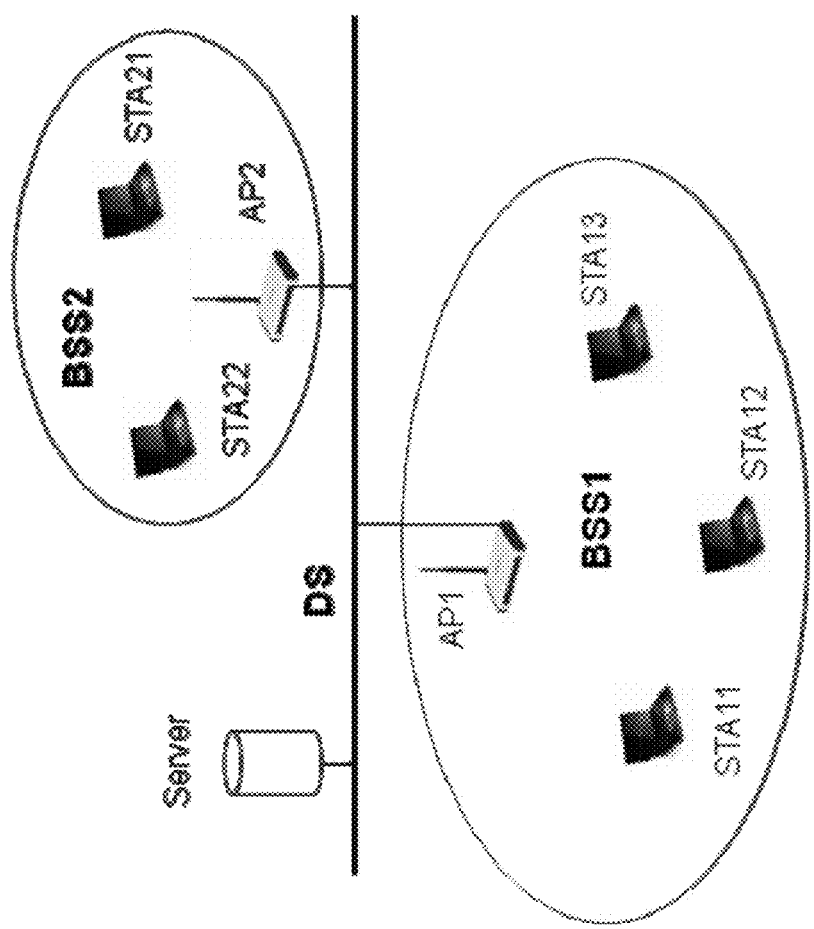
FIG. 1 shows an example of infrastructure Basic Service Set in a wireless communication system.

A central station being associated with other stations and dedicated to manage the BSS is referred to an Access Point (AP). A BSS built around an AP is called an infrastructure BSS. FIG. 1 illustrates an example of infrastructure BSS. BSS1 and BSS2 are infrastructure BSSes. BSS1 contains one access point (AP1) and several non-AP stations, STA11, STA12, and STA13. The AP1 maintains associations with stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the backhaul link between AP1 and AP2 or connected to a server through a distribution system (DS).

IEEE 802.11 wireless communications support multiple access and provides two types of access control mechanisms for multiple stations to access the medium:

A) Distributed Coordination Function (DCF)

B) Point Coordination Function (PCF).

PCF (or its enhanced version HCCA—hybrid control function controlled channel access) is a centrally controlled multiple Media Access Control mechanism used in IEEE 802.11 based WLANs. PCF resides in an AP to coordinate communications within the WLAN. The AP waits for PIFS time to contend the medium after the medium is idle. With higher priority of PCF than DCF, AP can take the medium earlier and send a CF-Poll (Contention Free Poll) frame to the PCF capable stations to permit it to transmit a frame over the medium. If the polled station does not have any frames to send, it shall transmit null frame to the AP. Otherwise, the polled station will take the transmission opportunity to send its data to the AP over the medium.

Since PCF (or HCCA) uses polling mechanism to control multiple access to share the medium, i.e. it alternatively polls all the associated stations to check whether they have data to send, it may encounter spectrum usage efficiency issue when there are a large number of associated stations in a BSS, such as in the hotspot of public area or conference room. When the number of associated stations is large, but less number of active stations, the PCF polling mechanism is not very efficient and causes a lot of medium waste.

DCF, on the other hand, relies on the carrier sensing multiple access with collision avoidance (CSMA/CA) mechanism to control the multiple medium access. Each station implements a CSMA/CA function. Before access to the wireless medium, the station has to sense the medium occupancy using CSMA/CA mechanism. If the station senses the medium is busy, it has to wait and retry sensing the medium in later time. If the station senses the medium in idle, it will wait for some inter frame space (IFS) and then enter the contention period called contention window (CW). In order to support multiple stations to access the medium, each station has to backoff a random time before transmitting over the medium.

Figure 2:
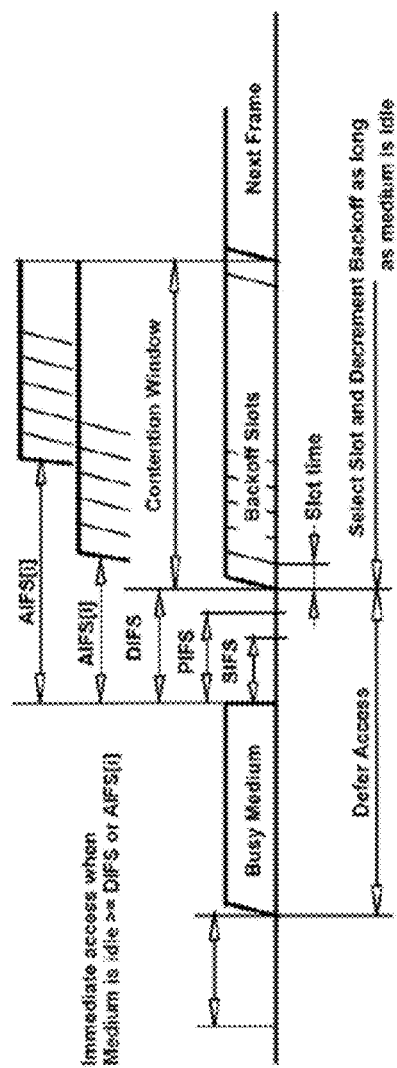
FIG. 2 shows an example of a prior art Carrier Sense Multiple Access/Collision Avoidance (CSMA/CA) mechanism in Distributed Coordination Function (DCF) in IEEE 802.11.

FIG. 2 illustrates an example of CSMA/CA mechanism of DCF in the current 802.11 specification. A station senses the medium. If the medium is busy, the station defers until the medium is determined as idle plus a period of time equal to xIFS when the last frame detected on the medium was received correctly. If the station is going to send a control frame such as ACK, then it has to wait for short interframe space (SIFS) time before transmission. If the station is going to transmit a management frame, it has to wait for the point coordination function (PCF) interframe space (PIFS). If the station is going to transmit the data frame, it has to wait for distributed (coordination function) interframe space (DIFS) or arbitration interframe space (AIFS) or enhanced interframe space (EIFS) before entering contention window.

In order to allow multiple stations to contend the medium, the DCF CSMA/CA mechanism uses the backoff time control mechanism in the contention window after waiting for xIFS period. Each station in the contention window has to backoff a random time which is defined as $$\text{backoff Time} = \text{Random}(\ ) \times a\text{SlotTime}$$

where Random( )=Pseudorandom integer uniformly distributed over the interval [0, CW], and CW is an integer: aCWmin≤CW≤aCWmax.

The existing CSMA/CA mechanism used in IEEE 802.11 suffers from overhead in each transmission and thus degraded medium utilization efficiency especially when a large number of stations share the same medium and transmit simultaneously.

Figure 3:
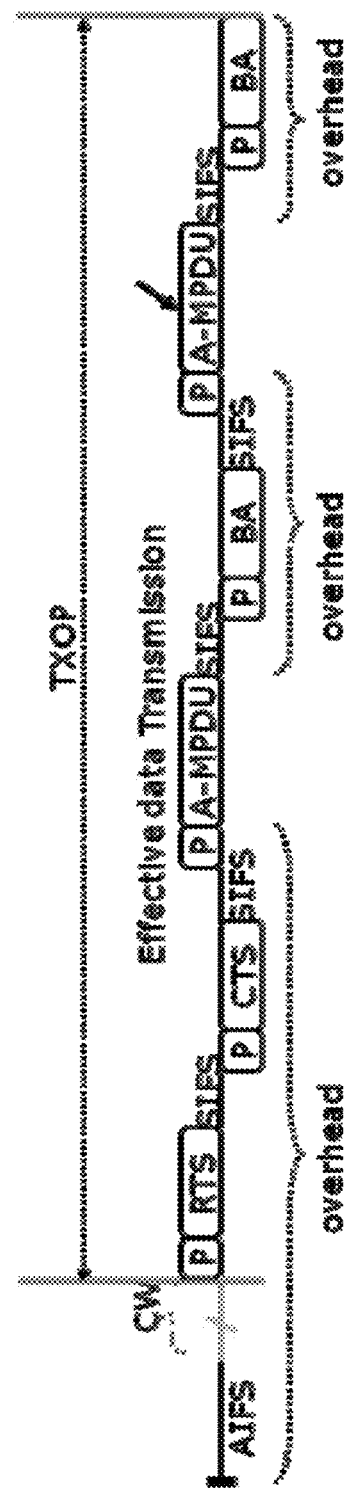
FIG. 3 shows an example of transmission overhead in DCF used in IEEE 802.11.

FIG. 3 shows an example of transmission overhead in the current IEEE802.11 CSMA/CA mechanism.

A) In the contention interval, the Arbitrate Inter Frame Space (AIFS) and contention window for backoff (CW) are the overhead to the user data transmission.

B) In the contention free (TXOP) period, the RTS/CTS (request to send, clear to send), ACK, preamble and the time interval between the DL and UL transmission (SIFS) are the overhead to the user data transmission Those overheads typically reduce the transmission efficiency. The more stations contend the medium for transmission, the less medium utilization efficiency. The more switching times between DL and UL transmissions, the less medium utilization efficiency and longer transmission latency.

In addition to the overhead in CSMA/CA mechanism, the downlink or uplink TXOP allocation for equal sharing of air time also creates a fairness issue for AP during contention. When many stations are associated with the AP, and in active transmission state, the possibility of transmission opportunity for every associated station and AP is same according to the CSMA/CA or EDCA mechanism. However AP is the aggregated point of WLAN and responsible to send all the DL frames for all the associated stations. If AP has the same possibility in contending TXOP as other stations, the chance of AP getting into TXOP is lower and lower as the number of associated stations increases. This will cause the DL throughput drops quickly as the number of associated stations reaches a certain threshold.

As more and more multimedia based services are being executed on mobile devices, the amount of mobile data consumed by mobile devices increases and this is leading to a growing asymmetry of the overall mobile data traffic. Measurements in today's mobile networks confirm the asymmetrical nature of the downloading data traffic considerably more than uploading, which causes downlink traffic and uplink traffic unbalance. Therefore the unbalance traffic between DL and UL would create even more unfair to the AP when using CSMA/CA to contend the medium.

TCP (Transmission Control Protocol) is a network layer protocol to provide reliable transmission based on the mechanism of acknowledgement to the transmission. It is originally designed for transmission in the wired networks. When a transmitted packet is not acknowledged or delayed, the transmitter assumes the network is experiencing congestion and increases the TCP sliding window to reduce the transmission rate. The longer delay of ACK, the lower of transmission rate.

However, when TCP mechanism is used in the wireless communication, the loss of packets does not always mean congestion. In most cases, the loss of packets is due to radio environment such as interference, fading, weak receiving signal, etc. Even the hybrid automatic retransmission (HARD) mechanism is used in the wireless air interface for retransmitting lost packets; it may cause the packet delay in TCP layer especially for aggregating more packets in single transmission. Therefore TCP would treat the delayed acknowledgement as congestion and still adjust its sliding window to reduce the transmission rate. This will cause the performance degradation in the wireless networks.

Those issues would cause 802.11 very low medium usage, long access latency or congestions with poor user experience, especially when many active stations are going to transmit frames in hotspot, meeting rooms, or other high density locations.

In order to improve the medium utilization efficiency and reduce the transmission latency for improving user experience, in one aspect, the present document provides techniques to separate channel access mechanism from data transmission.

For the channel access, it can still leverage existing CSMA/CA mechanism for backward compatibility to the legacy systems. For new full-duplex stations, a new technique enhances CSMA/CA mechanism to support Collision Early Detection and Avoidance (CEDA) for improving medium usage.

For data transmission after communicating stations acquire the medium, in some embodiments, simultaneous DL and UL transmissions can be performed using a full duplexer to form some kind of spatial separation between DL and UL transmissions so as to increase the transmission capacity and reduce the transmission latency.

Figure 4A:
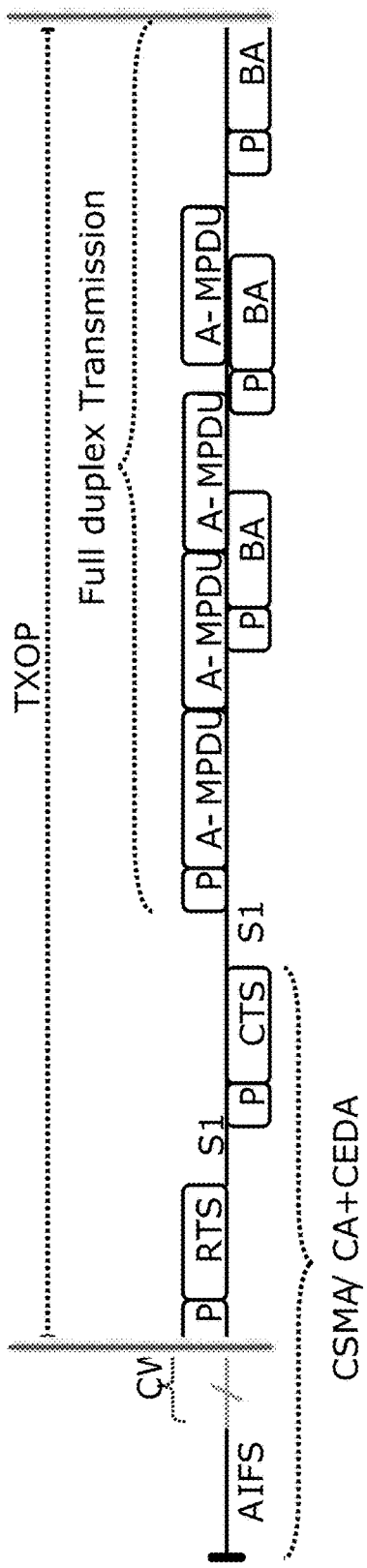
FIGS. 4A and 4B show examples of invented CSMA/CA+CEDA with full-duplex transmission mechanism.
Figure 4B:
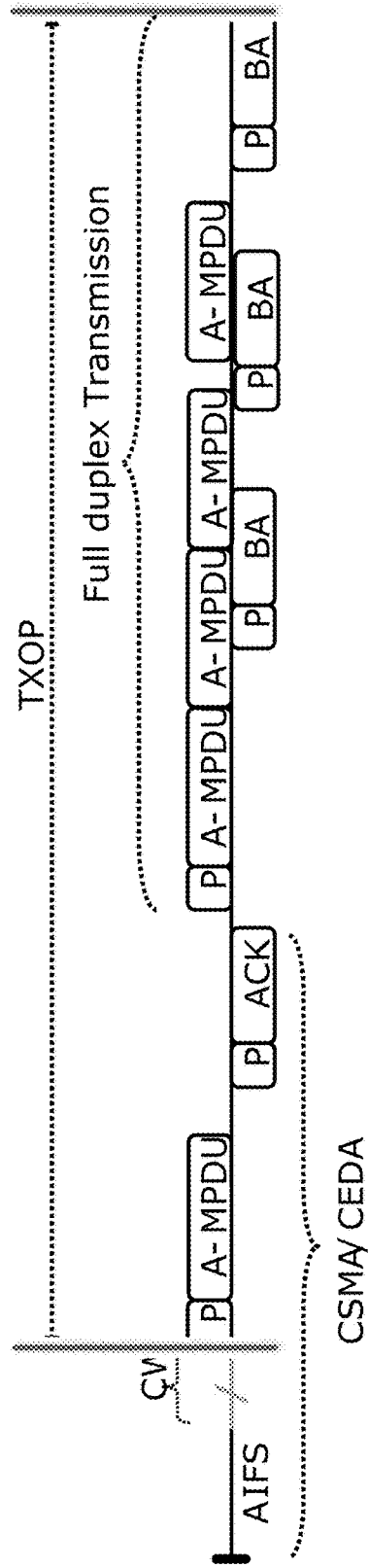

FIG. 4A and FIG. 4B show examples of CSMA/CA+CEDA with full duplex transmission mechanism.

When legacy stations (e.g., current 802.11 stations) detect the medium in idle state, they enter the contention interval using CSMA/CA mechanism for multiple accesses. All the legacy stations that are going to transmit have to wait for AIFS time and backoff the time specified by their contention window (CW) values and then contend the medium via sending a RTS. The responding station will send a CTS to confirm the communication link establishment.

The full duplex stations, however, can use the CEDA mechanism to contend the medium.

Once the communication link is setup, both success stations enter full-duplex transmission period (i.e. after CTS) and can transmit frames to each other simultaneously using full duplex transmission mode.

Figure 5A:
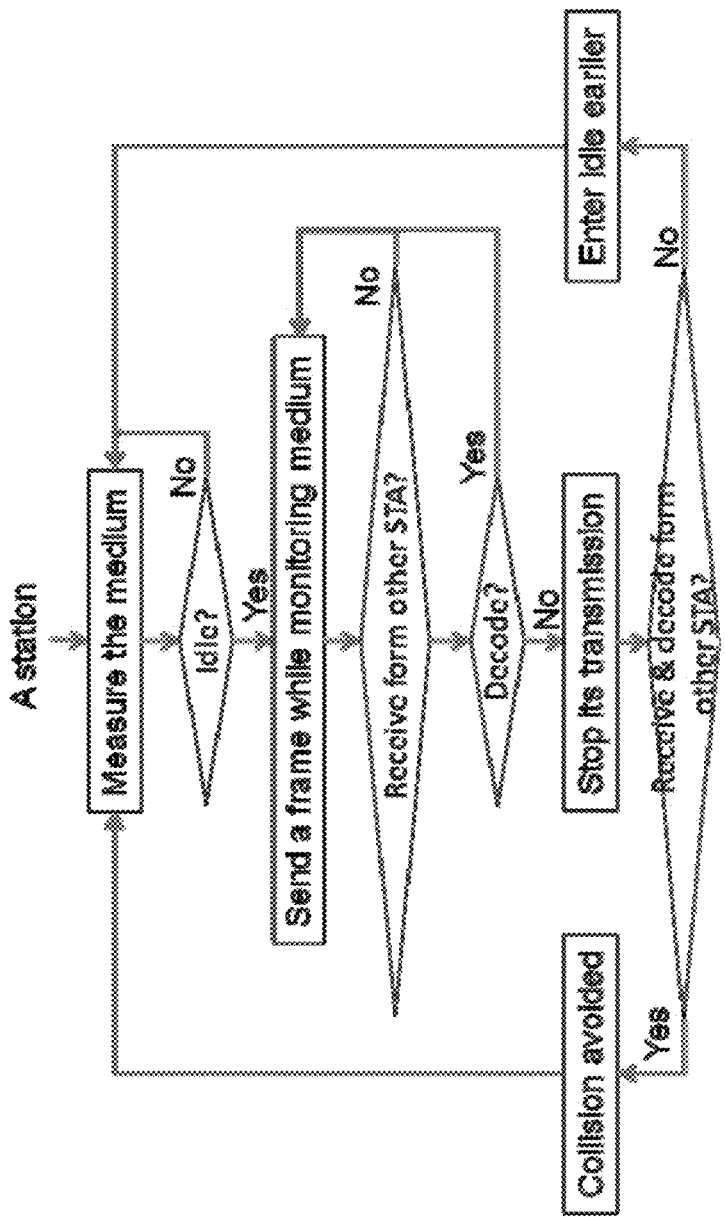
FIGS. 5A and 5B are flowchart depictions of examples of CEDA procedures.

FIG. 5A shows an example of procedure of CEDA mechanism. A full-duplex station calibrates the radio parameters in the preamble time, and continues monitoring the air interface after calibration. If the full-duplex station detects transmission signal from other stations while it is transmitting and cannot decode received frame, it means that the collision occurs. It then stops its current transmission immediately. If the station can still hear the transmission from other station and decode frames successfully while it is transmitting, then the collision is avoided. If the station does not hear transmission from other stations after stopping its transmission, it could mean other station may stop the transmission as well. In this case, the medium is bought back to idle state early and is prepared for new contention. If two CEDA stations (STA1 and STA2) contending the medium at the same could be able to hear and receive the transmission from other stations successfully, the TXOP ownership will be given to the station that receives the acknowledgement. If the STA1 receives a CTS addressed to it, then it gets the TXOP and continues its transmission. The STA2 performs backoff and contends the medium again. If the responding station receives signals from both stations at same time, but cannot decode frames successfully, then the responding station will not send a CTS. Therefore, none of those contending stations acquires the TXOP, and it will have to contend the medium again. If more than two CEDA stations contends the medium at same time, it is possible that each station can hear more than two transmissions from other stations, but may not be able decode them correctly. Therefore the CEDA station should stop its transmission to avoid collision.

Figure 5B:
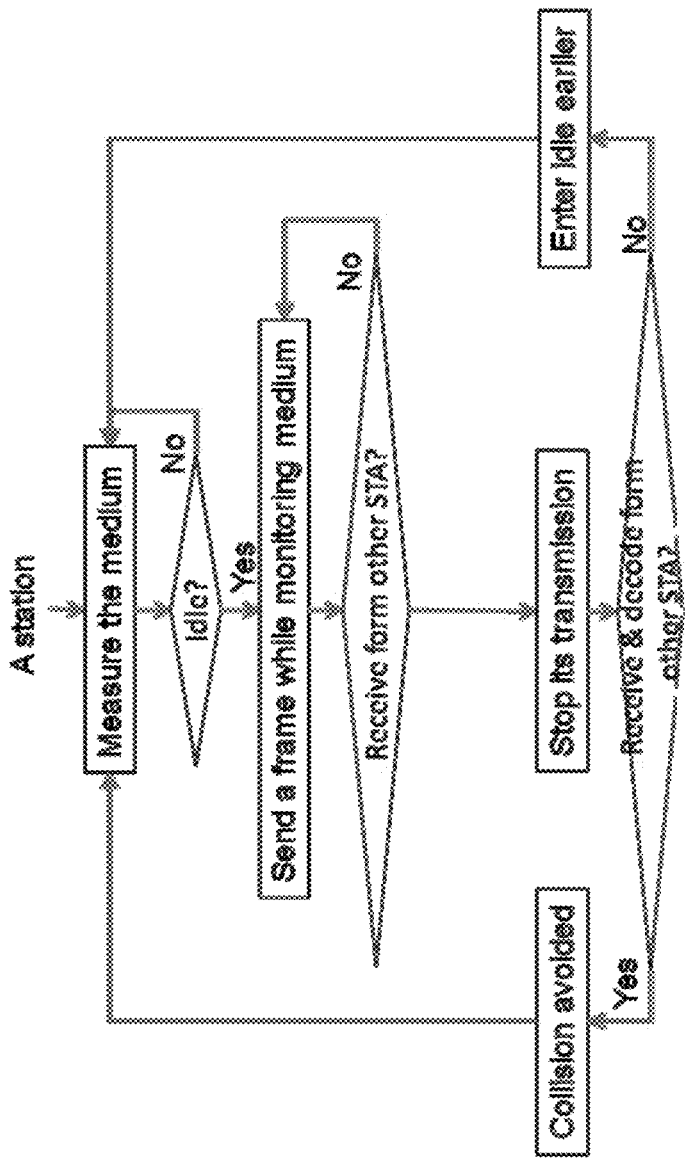

FIG. 5B shows an alternative CEDA mechanism. In the contention window, a transmitting CEDA station stops its transmission immediately after it detects a transmission from other station (no matter whether it could decode correctly or not). In other word, it only allows one transmission in contention window so as to prevent from collision as early as possible. In one advantageous aspect, this will make transmissions over the medium more reliable.

Comparing to the CSMA/CA mechanism in which the transmitting station would not know the collision occurrence until the response timer expires, the CEDA mechanism could detect and avoid collision in the early stage and allow the medium back to contention period once the collision is detected. Therefore CEDA would reduce the possibility of collision and would improve the transmission reliability.

In some implementations, the full-duplex transmission operation is based on a self-interference cancellation procedure. The self-interference cancellation procedure determines the performance of full-duplex transmission. The higher suppression on self-interference at the receiver, the lower noise floor at the receiver of the device and higher modulation coding scheme could be used for the communication. In other words, the full-duplex mechanism establishes some spatial separation between the transmission path and the receiving path so that the simultaneous transmission and receiving could be able to perform over the same frequency channel.

Figure 6:
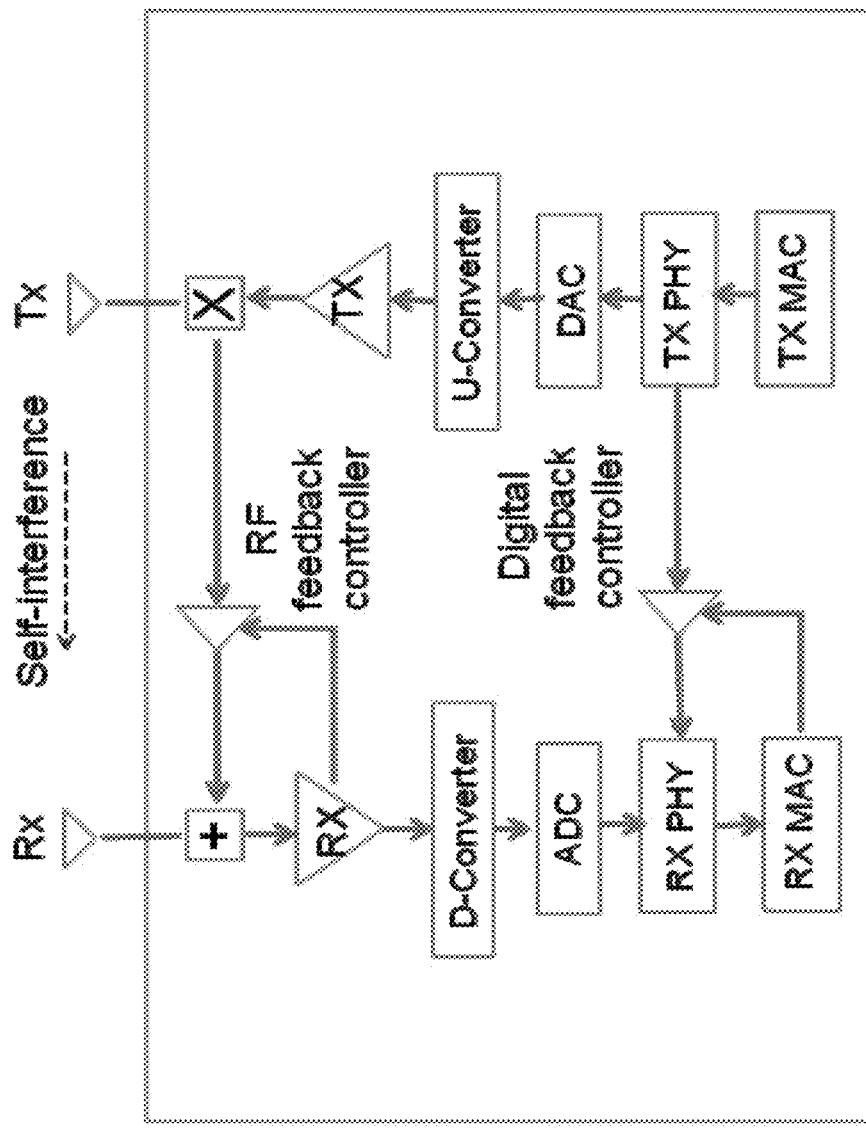
FIG. 6 shows an example of full-duplex radio station architecture.

FIG. 6 shows an example of a full-duplex radio transceiver station architecture, which could be used in various examples of radio stations including access points and stations in FIG. 1. A full-duplex radio station such as an access point or a wireless station can include processor electronics such as a microprocessor that implements methods such as one or more of techniques presented in this document. A full-duplex radio station can include a separate transmitter electronics (such as Tx MAC/PHY, digital to analog convertor DAC, up-converter, power amplifier, Tx signal splitter, and Tx antenna) to emit wireless signals; and a separate receiver electronics (such as Rx antenna, RF signal mixer, low noise amplifier LNA, down converter, analog to digital convertor ADC, RX PHY/MAC) to receive signals over the medium. The transmit antenna and receiving antenna are separated in space to provide space isolation. The separation of transmitting and receiving electronics can be used to make the timing synchronization between AP and STA independent in DL and UL. For the DL path, the receiving STA could synchronize its timing to AP's timing; while for UL path, the AP could synchronize its timing to the transmitting STA's timing. The full-duplex radio station can include other communication interfaces for transmitting and receiving data. In some implementations, a full-duplex radio station can include one or more wired communication interfaces to communicate with a wired network. A full-duplex radio station can include one or more memories configured to store information such as data and/or instructions.

The two separate radio chains in the full-duplex radio station can be operating independently. For example, while the receiving radio chain receives signals from the receiving antenna, the transmit radio chain is allowed to transmit radio signal over the transmit antenna on the same frequency band (at the same frequencies).

Between transmitting and receiving radio chains, the feedback controller electronics controls and forwards the inverse and filtered transmitting signal to the mixer and/or PHY of receiving radio chain for cancelling the transmitting signal looped back to the receiver electronics over the air when both transmitter and receiver are operating on the same frequency.

The self-interference cancellation of the full-duplexer can be performed at any or all of the following three levels:

A) Spatial separation between transmit antenna elements and receiving antenna elements. With the transmitting and receiving antenna's placement separation, the transmitting signal could be reduced in looping back to the receiving radio chain.

B) Analog cancellation via subtracting the adjusted ingress of the transmitting signal at RF mixer from the receiving signal to avoid LNA and ADC saturation. This may improve the performance of spatial separation between TX path and RX path.

C) digital cancellation at baseband level to further filter out transmitting signal. This may further improve the performance of spatial separation between TX path and RX path.

Figure 7:
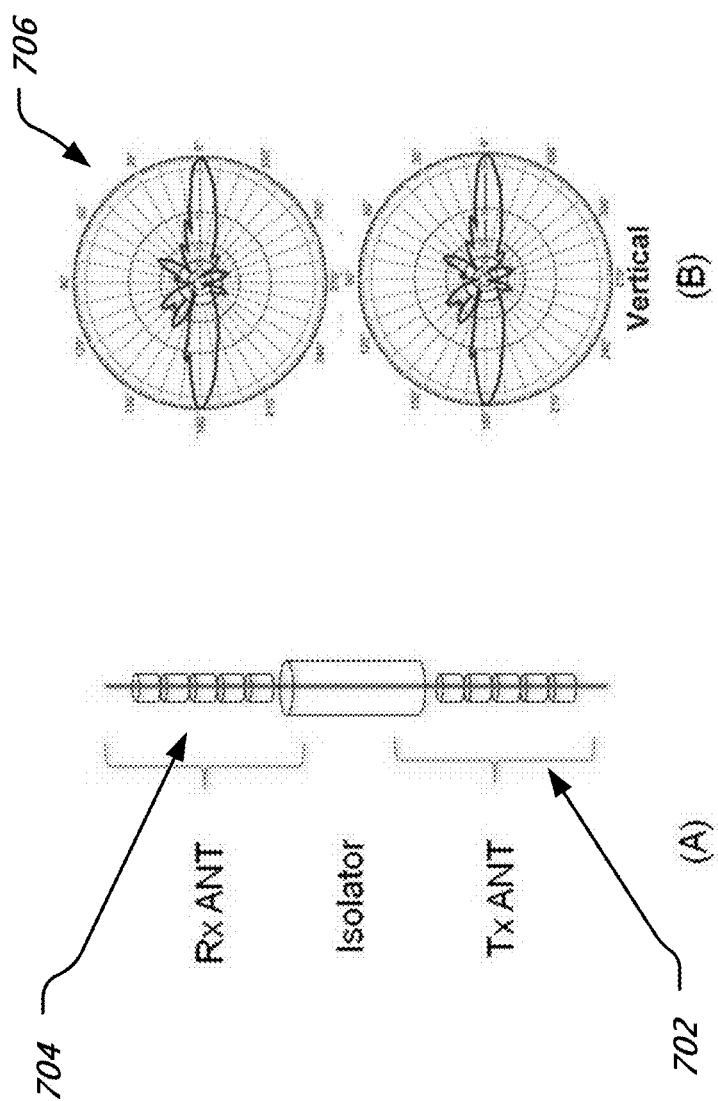
FIG. 7 shows an example of dual-layer antenna array for full-duplex radio station.

FIG. 7 shows an example of dual-layer antenna arrays for omni-directional operation. The dual-layer antenna array for full duplexer contains one or more transmit antenna elements 702 and one or more receiving antenna elements 704. The transmit antenna elements may be placed at the bottom of the dual-layer antenna and the receiving antenna elements may be placed at the top of dual-layer antenna, with "top" and "bottom" referring to the placement within the figure only.

In some implementations, the transmit antenna elements are placed in an array in the vertical direction to form a horizontal beam. In the omni case, the beam formed by the dual-layer antenna array is still with omni-direction in horizontal, but will be narrowed in vertical direction. The receiving antenna elements are also placed in an array in vertical and form an omni-direction beam in horizontal as well. The transmit antenna elements and receiving antenna elements are placed separately and by an isolator so as to provide better space isolation. In this document, the directional terms "vertical" and "horizontal" are used only for ease of description of the drawings and in a relative orthogonal sense. In practice, antennas may be placed in any direction on a wireless device and may extend in any spatial direction.

Both transmit and receiving dual-layer antenna elements for full-duplexer form a flat beam in horizontal. Pattern 706 illustrates an example of radiation pattern of dual-layer antenna array. The maximum antenna gain for both transmit antenna array and receiving antenna array of dual-layer antenna is on the horizontal direction. On the vertical direction, the gains of transmit and receiving antenna arrays could reach their minimum. Therefore the dual-layer antenna arrays could provide an extra isolation between the transmit antenna elements and the receiving antenna elements in addition to spatial separation between the transmit antenna and receiving antenna.

FIG. 7 just shows an example of dual-layer antenna array for omni-direction case. Actually, the antenna element could be omni or directional. If antenna elements are omni, the dual-layer antenna is omni-direction. If antenna elements are directional, then the dual-layer antenna could be used for the sector based full-duplex transmission.

RF feedback controller is to control feedback of the inversed transmitting signal to the mixer of the receiving chain electronics for cancellation at RF level. The digital feedback controller is to control the feedback of inversed and filtered transmitting signal at baseband level.

Assume the received signal at Rx antenna is $Srx(t)+a(t)*Stx(t)$

Where $Srx(t)$ is signals received from other station(s)

$a(t)*Stx(t)$ is the transmitting signal looped back from its transmitting antenna to the receiving antenna.

$a(t)$ is the channel model between the transmit antenna and the receiving antenna of the full-duplexer;

$Stx(t)$ is the transmitting signal from the transmit antenna.

Assume the corrected received signal at RF level or digital level is $$Rrx(t)=Srx(t)+a(t)*Stx(t)+c(t)*Stx(t)$$

If c(t)=−a(t), the transmitting signal can be cancelled from the received signal. In such a case, $$Rrx(t)=Srx(t)+a(t)*Stx(t)+c(t)*Stx(t)=Srxt(t)$$

Due to implementation error and estimation error, there might be some residual of transmitting signal in the corrected received signal after cancellation of self-interference at RF level. To further cancel the residual signal of transmitting signal, the full-duplexer can further filter out the transmit signal in the digital base band processor.

The self-interference cancellation for the full-duplexer can be applicable to a multiple antenna system (MIMO), as discussed next.

Figure 8:
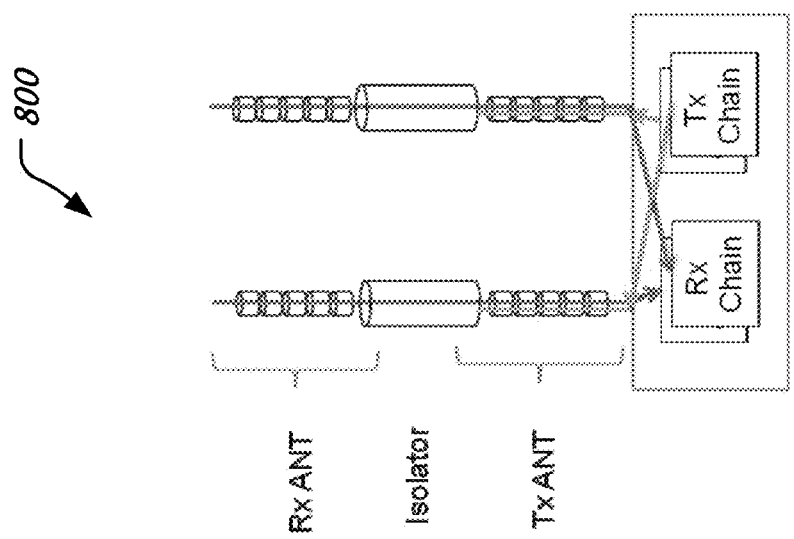
FIG. 8 shows an example of dual-layer antenna array for full-duplex MIMO radio station.

FIG. 8 illustrates a full-duplex MIMO station 800 with two dual-layer antenna arrays for simultaneous downlink and uplink transmission. The MIMO full-duplexer contains two independent dual-layer antenna arrays which provide two separate transmission paths and two receiving paths to form downlink MIMO and uplink MIMO.

In some implementations, full-duplex radio stations can communicate with each other based on IEEE 802.11 air interface. In some implementations, full-duplex radio stations can communicate Universal Mobile Telecommunications System (UMTS) and/or evolved UMTS Terrestrial Radio Access Network (E-UTRAN) or other Third or Fourth generation 3G/4G technologies.

In order to achieve good performance of cancellation of self-interference from transmitters, it may be beneficial to calibrate parameters of radio environment for full-duplex transmission frequently. As the medium time is divided into channel access time for multiple stations to contend medium (contention period) and transmission time for the paired successful stations to communicate with each other (contention free period). In some implementations, the initiating station may calibrate the radio parameters during requesting the medium.

Figure 9:
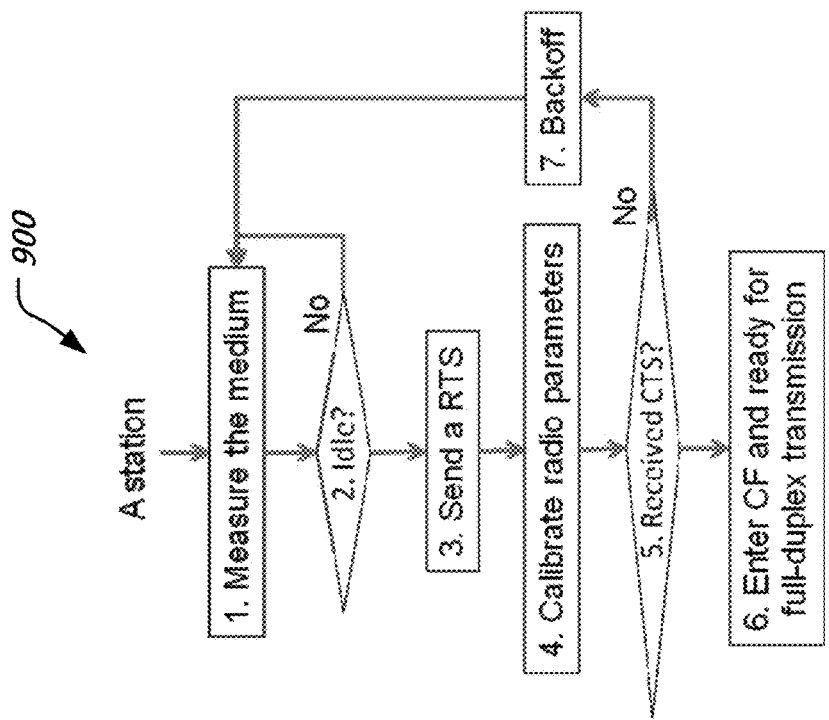
FIG. 9 shows an example of a flowchart of full duplex calibration and self-interference cancellation procedure.

FIG. 9 shows an example of procedure 900 of a full-duplex station channel access and the calibration. For simplicity, the procedure 900 is described using 802.11 terminologies.

1. A station that is to transmit a frame to another station senses the medium until the medium is in idle.

2. When the medium becomes idle for DIFS or AFIS time depending on the transmit type, the station enters the contention period and calculates the backoff timer value. For the initial transmission, the station uses aCWmin to determine the initial backoff timer value. For re-transmission due to collision, the station sets the backoff timer value according to CW value.

The station continues sensing the medium in the contention window period. If the station still senses the medium idle, it decreases the backoff timer by 1 slot, and continues sensing the medium. Otherwise, if the medium is busy, the station shall stop the backoff procedure until the next contention period, and shall not decrease the backoff timer for that slot.

3. When the backoff timer reaches to 0, the station is allowed to occupy the medium for transmission RTS frame.

4. During the transmission of RTS, the radio station uses the preamble training sequence of RTS frame to calibrate radio parameters for self-interference cancellation algorithm.

5. Station waits for the CTS.

6. If the station receives a CTS in response of its RTS, it indicates the station has acquired the medium and enters the contention free period. The station uses the calibration result for the self-interference cancellation algorithm to cancel its transmissions at the receiver of the station during full-duplex communications in the TXOP interval.

7. If the station does not receive a CTS in response of its RTS, it means that the medium is not granted to the station for further transmission and the previous calibration may not be void. The station shall increase CW by the integer powers of 2 for every failed (re)transmission of RTS, up to the value of CWmax, calculate a new backoff timer value and continue sensing the medium for re-contention.

Figure 10:
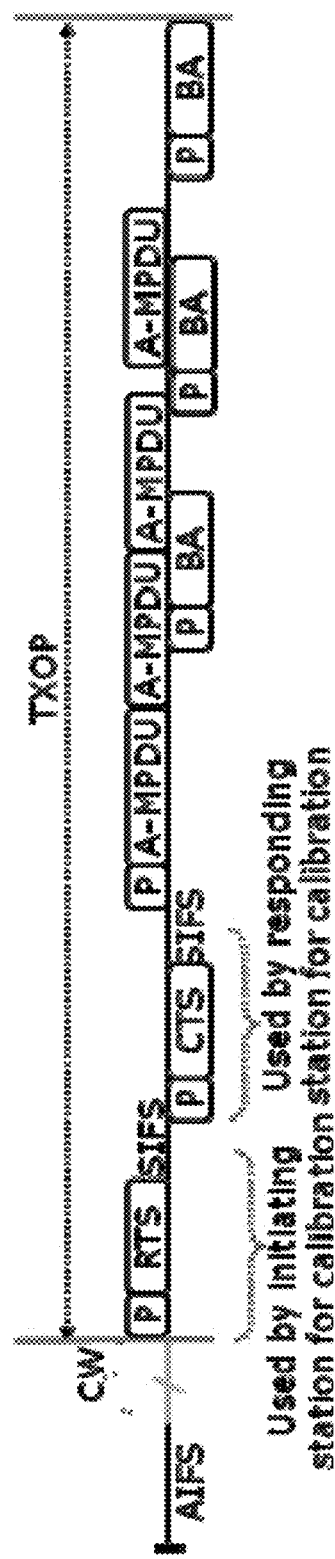
FIG. 10 shows an example of full-duplex calibration during CSMA/CA.

FIG. 10 shows an example of radio parameters calibration for full duplexer. When a station sends a RTS to contend the medium, the station could use the preamble training sequence to calibrate the full-duplex.

If the RTS is responded by a CTS successfully, the calibration of full-duplex in the initiating station is valid, and the calibration result could be used for the self-interference cancellation in the following transmission in the TXOP.

If the initiating station fails to receive a CTS responding to the RTS, it means either RTS fails to be received by the destination station or CTS fails to be received by initiating station. Therefore the initiating station loses the TXOP. The calibrated radio parameters may be discarded.

A responding full-duplex station can calibrate the radio parameters using preamble in CTS frame as the training sequence when sending a CTS to response of RTS. If the responding full-duplex station continues receiving frames from the initiating station after sending a CTS, it uses the calibrated radio parameters for cancelling self-interference at the receiving chain during transmitting to the peer stations.

In some implementations, the cancelation radio parameters are calibrated on every TXOP for improving the performance of self-interference cancelation.

After CTS, both communicating stations enter contention free period and are ready for simultaneous DL-UL transmission over the same frequency channel.

Each station in the communication can receive frames sent from the other station using the full duplex self interference cancellation mechanism to mitigate or remove its transmitting signal at the receiver.

Figure 11:
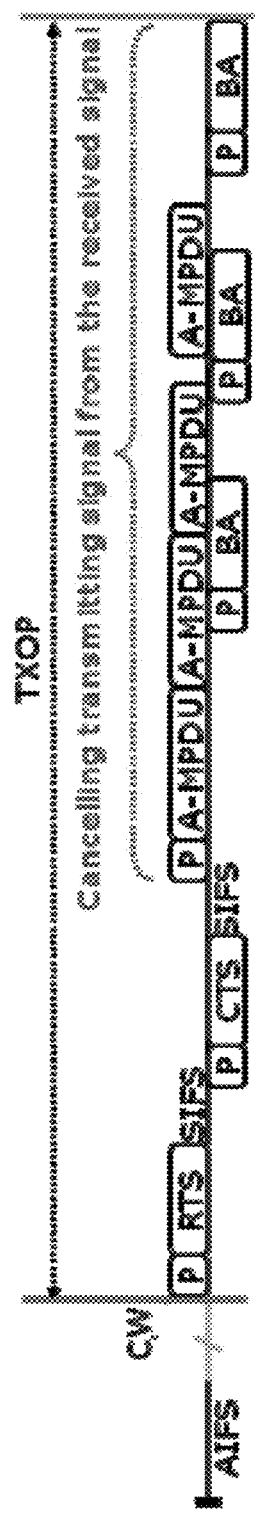
FIG. 11 shows an example of cancellation of self-interference in TXOP.

FIG. 11 shows an example of communicating stations can perform simultaneous transmissions in TXOP using full-duplex transmission mechanism. In the contention period of RTS/CTS, communicating stations include the full duplex transmission capability indication. The initiating station can include the full-duplex capability indication in RTS, while responding station can include its full-duplex capability indication in CTS frame if they support full-duplex. Once both communicating stations confirm support of full duplex transmission, they can perform simultaneous downlink and uplink transmissions in the TXOP so as to improve the medium usage efficiency. The transmit chain of full-duplex station can send frames while the receiving chain receives frames over the air. The receiving chain of full-duplex station suppresses the transmitting signal from the received signal over the air to cancel the self-interference generated by the transmitter.

The full-duplexer can support different full-duplex transmission modes.

Figure 12:
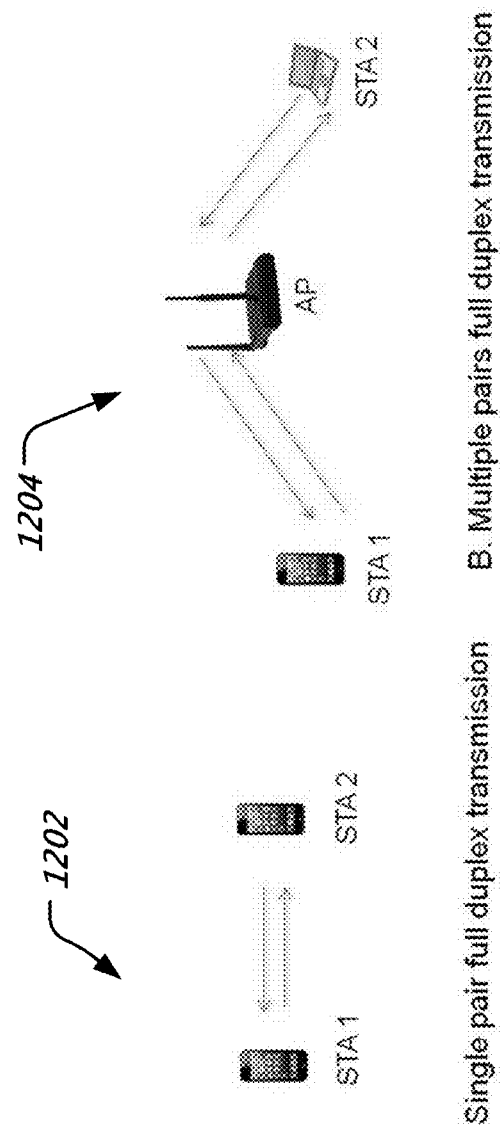
FIG. 12 shows an example of full-duplex transmission modes.

FIG. 12 shows examples of full-duplex transmission modes. The arrangement 1202 shows an example of single pair full-duplex transmission. The arrangement 1204 shows an example of multiple pairs of full-duplex transmission with AP.

Figure 13:
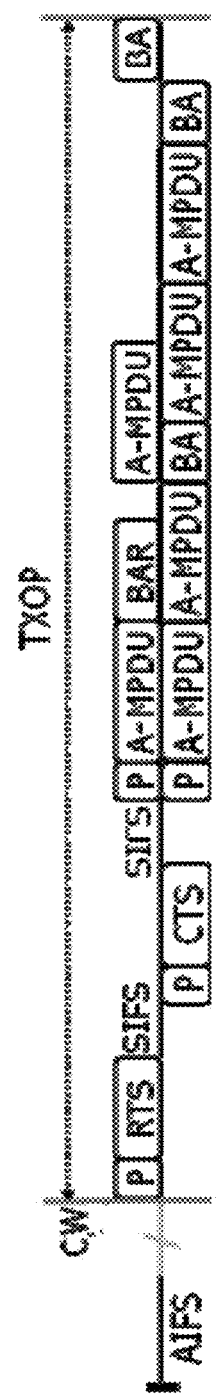
FIG. 13 shows an example of single pair simultaneous transmission.

If the TXOP is owned by a non-AP STA, communicating stations can start full-duplex transmissions simultaneously until the end of TXOP as shown in FIG. 13.

Figure 14:
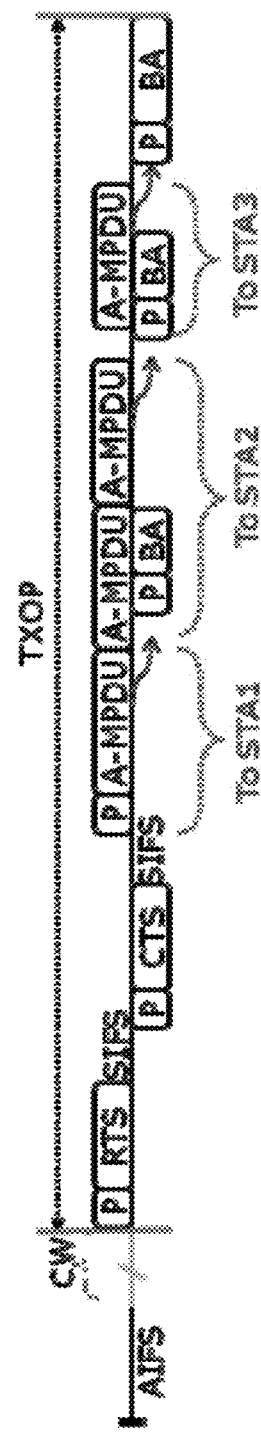
FIG. 14 shows an example of multiple pairs of simultaneous transmissions.

If the TXOP is owned by AP, AP can schedule full-duplex transmissions to multiple stations in TDD manner for SISO (single input single output) mode, e.g., as shown in FIG. 14.

After acquiring TXOP, AP may notify non-AP stations to be communicating with to stay awake for that TXOP, and schedule a transmission interval for each station being served one by one. During each transmission interval, a station can send an ACK (or BA) to response of downlink data and/or send uplink data to AP while receiving frames from AP. Once the AP completes communication with the full-duplex STA 1, for example, AP can then schedule the time to transmit to another full-duplex station STA 2. STA 2 can also transmit data and signal to AP during receiving frames from AP. In this way, it would avoid the medium contention from multiple stations through scheduling by AP, and improve the medium occupancy efficiency.

Hidden nodes issue is one of the biggest challenges in WLAN deployments. Since WLAN uses an asynchronous access mechanism and its deployment may be unplanned, hidden node stations could interfere normal transmissions especially in the environment of large number of hidden nodes.

With full-duplex transmission mechanism, AP can transmit beacon or other signals even when it receives frames sent from other stations. The other communicating station can also transmit signals during receiving frames. This would help other idle stations that try to contend the medium to detect the medium occupancy status and prevent from interference to the communicating stations.

Figure 15:
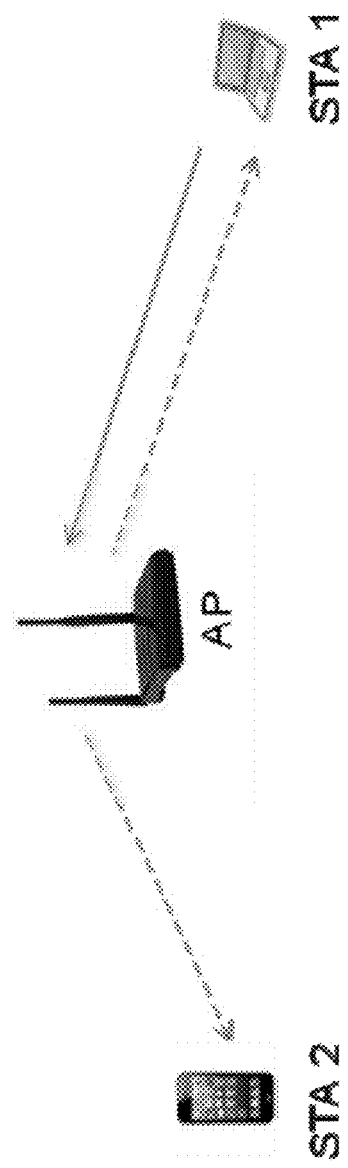
FIG. 15 shows an example of reducing hidden node issue using full-duplex transmission.

FIG. 15 shows an example of using full-duplex transmission mechanism to transmit signal during receiving frames for reducing hidden node issue in WLAN. Station STA 1 and STA 2 have associated with the AP, but they cannot hear each other. When STA 1 sends frames to the AP, STA 2 would not detect the signals over the air. As result, STA2 could detect the medium as idle, and may send frames to the AP and may cause the interference to the transmission between STA 1 and AP.

With the full duplex transmission, AP can send signals and/or data while receiving frames from STA 1. Therefore, STA 2 would be able to detect the medium being occupied and would not initiate transmission to AP.

Figure 16:
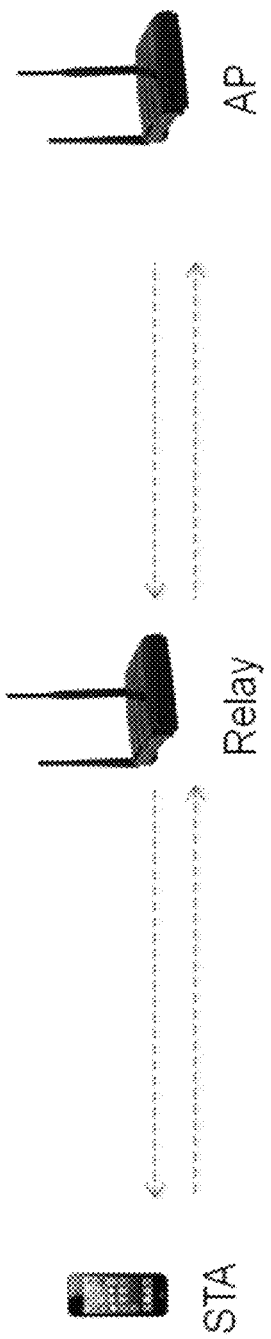
FIG. 16 shows an example of using full-duplex for fast forwarding in relay station.

FIG. 16 shows an example of using full-duplex mechanism in relay station for fast forwarding the received packet to the next hop so as to reduce transmission latency caused by relay. The fast forwarding mechanism is based on the principle of TXOP co-owned by a non-AP station, a relay station and AP. When the relay station receives A-MPDU, it can forward the packet immediately to the next station using full-duplex transmission mechanism. The final destination station would acknowledge to the received packets forwarded from the relay station.

Figure 17:
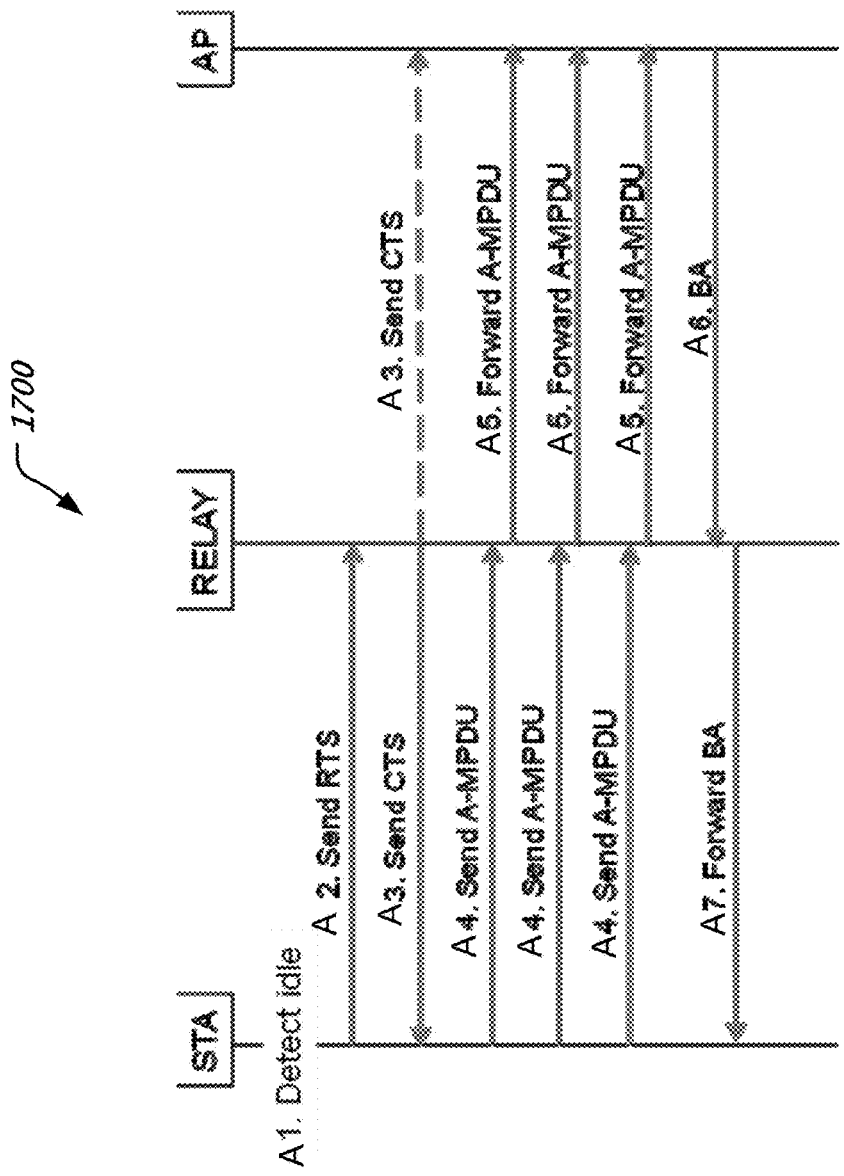
FIG. 17 shows an example of fast forwarding procedure of full duplex relay station.

FIG. 17 is a signal exchange diagram 1700 representing a procedure of full-duplex relay station for fast forwarding.

A1. A station STA has associated with the relay, and monitors the medium. It detects the medium in idle and enters contention period.

A2. The STA sends a RTS to the relay station to request the medium.

A3. The relay station receives the RTS and checks the communication link of AP. If the relay station detects the communication link of AP is busy, it will not respond the RTS since its transmission to the STA would interfere to the communication of AP and cause the hidden node interference. If the relay station finds the communication link to AP is idle, the relay station will send a CTS to the STA.

Meanwhile the AP will receive the CTS frame as well and marks medium to be occupied by the relay station in the following TXOP using NAV.

A4. Once receiving a CTS, the STA starts transmitting A-MPDU one by one to the relay station.

A5. The relay station will forward the received A-MPDU to the AP immediately using full-duplex transmission mechanism. If the STA receives the A-MPDU sent by the relay station, it discards the received A-MPDU.

A6. AP responds received A-MPDUs with Block ACK (BA) to the relay station after receiving multiple A-MPDUs from the relay station.

A7. The relay station forwards the BA to the STA.

In some embodiments, the full-duplex mechanism can be used in the simplified simultaneous transmission and receiving (STR). In the simplified simultaneous transmission and receiving case, only AP may be capable of performing the full-duplex communications to two stations at the same time, while stations in the communication may use half-duplex mechanism to transmit a frame to AP or receive a frame from AP.

Figure 18:
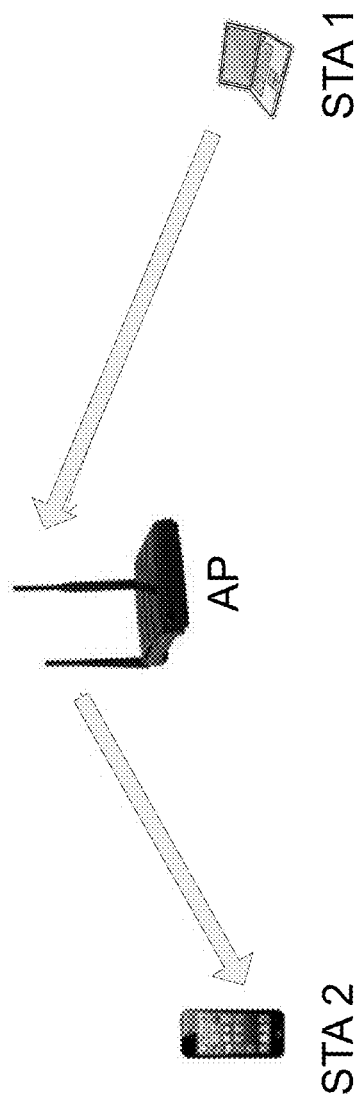
FIG. 18 shows an example of simplified simultaneous transmission and receiving using full-duplex transmission mechanism.

FIG. 18 shows an example of the simplified STR procedure. In this example, only AP is the full duplex device, while STA1 and STA2 are regular half-duplex stations. When a half-duplex station STA1 is sending data to AP, the AP is allowed to use this receiving time interval to transmit a frame to another station STA2 in the BSS if the AP knows the transmission from STA1 would not severely interfere the STA2 to receive the frame sent from the AP.

Figure 19:
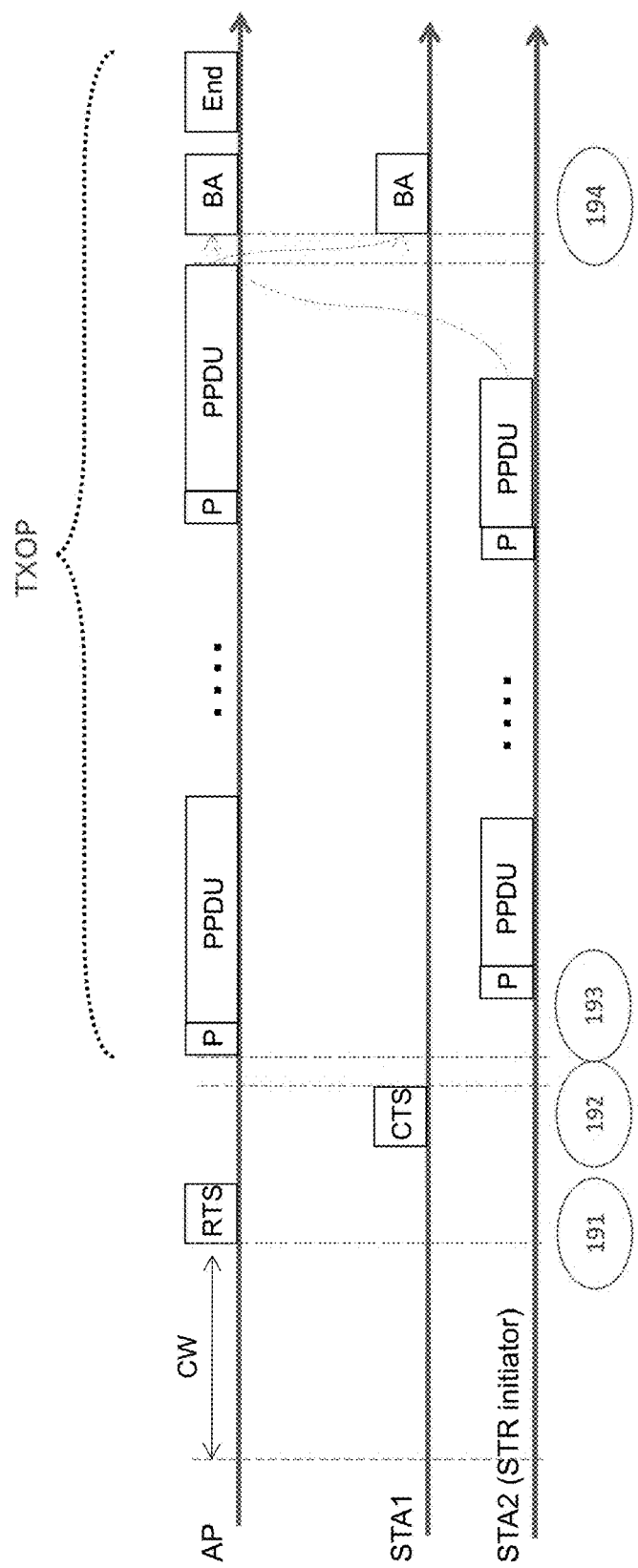
FIG. 19 shows an example of STA initiated simplified STR with deferred ACK.

FIG. 19 shows an example of STA initiated simplified STR with deferred ACK. In this example, the AP is capable of performing full-duplex transmission, while STA1 and STA2 support half duplex transmission.

191. The AP starts the medium contention via sending a RTS (or other frame) with the full-duplex capability indication, and the duration information (T1) for transmitting the buffered data to STA1 which includes the time of transmitting SIFS, CTS, SIFS, PPDU(s), SIFS and ACK/BA.

192. The AP acquires the TXOP for transmissions after receiving a CTS from STA1.

193. Then the AP can send a PPDU including SIG information to the STA1. Meanwhile STA2 (STR initiator) knew that the AP is capable of performing full-duplex transmission from the received RTS. The STA2 measured the path loss and link budget of STA1 in received CTS, and knew that its new transmission to AP would not interfere the existing communication between the AP and the STA1 severely. According to the duration information (T1) in received in RTS/CTS for the existing transmission, the STA2 can determine the duration (T2) of new STR transmission: T2=T1−SIFS−CTS time−SIFS−ACK time in the single protection under EDCA. In order to find more actuate duration for new transmission, if possible, the STA2 would decode the SIG field in the PPDU sent by the AP and use the duration (T3) information in the SIG of PPDU to determine the new transmission duration (T2). T2 can be calculated from the time after decoding SIG field of PPDU to the same ending of T3 (T2<T3). The STA2 uses the T2 calculated from T3, if it is available. Otherwise, the STA2 can use the T2 calculated from T1 to determine the duration of new transmission. The STA2 then starts transmitting a PPDU to the AP within T2. Therefore the full-duplex AP could receive a PPDU sent by STA2 while it is transmitting a PPDU to the STA1. The transmission of PPDU sent by the STA2 is finished within T2 before the transmission of PPDU from the AP complete (within T3). In this way, it allows the AP to receive an ACK (or BA) from STA1 in SIFA time immediately after the AP completes transmission to STA1.

194. Once the full-duplex capable AP receives the PPDU(s) from the STA2 successfully, it may defer sending the ACK (or BA) to STA2 till it completes transmitting its current PPDU to the STA1. The STA2 waits for the deferred ACK (or BA) after it finishes transmission to the AP. When the STA1 receives the PPDU from AP successfully, it sends an ACK (or BA) to the AP within SIFS time.

Figure 20:
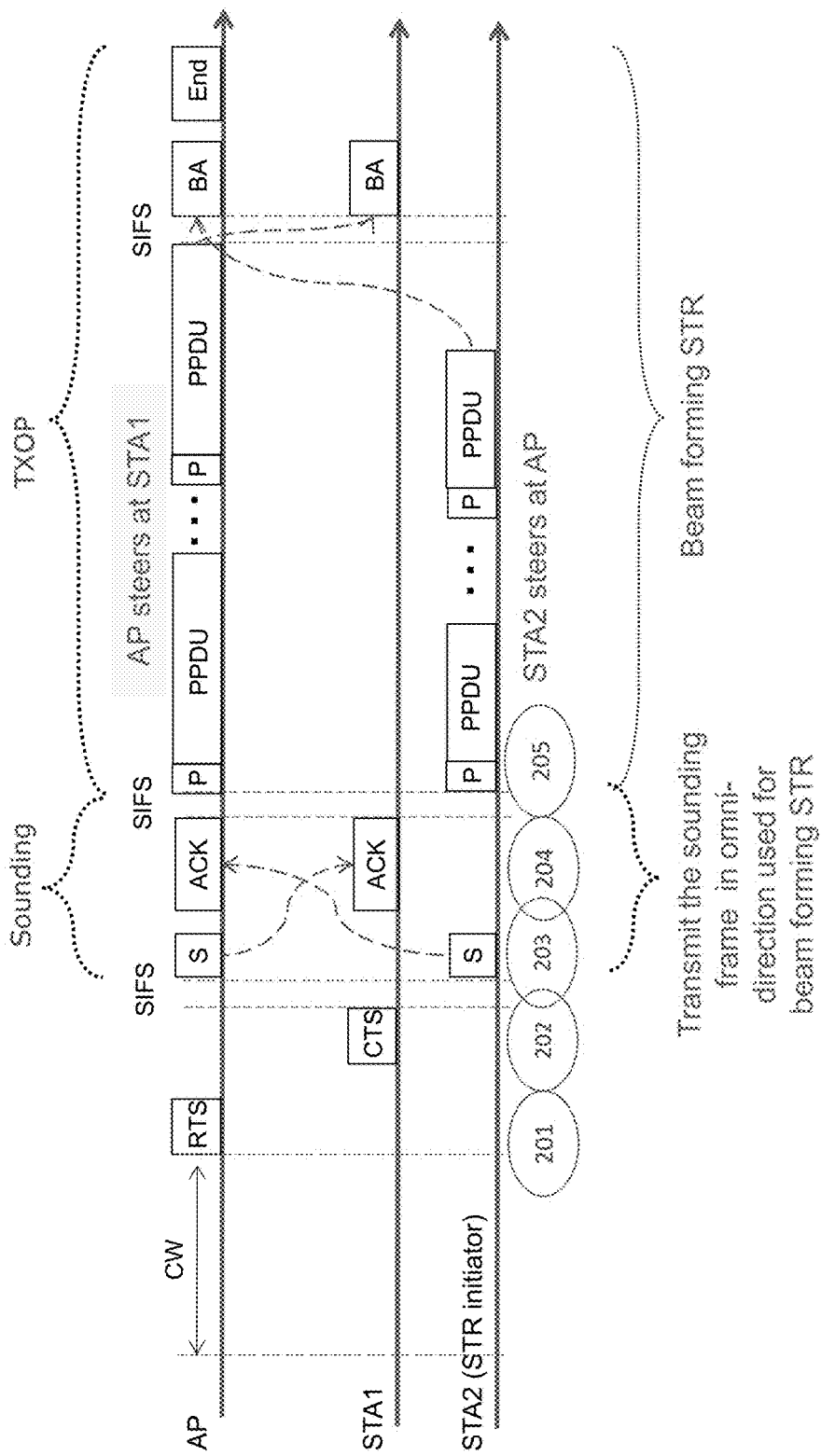
FIG. 20 shows an example of STA initiated simplified STR with beam forming option.

FIG. 20 shows an example of STA initiated simplified STR with beam forming option.

201. The AP supports full-duplex transmission and starts the medium contention via transmitting a RTS (or other frame) with full-duplex capability indication, transmit beam forming capability indication and duration information for transmitting PPDU(s) to STA1.

202. The AP occupies the medium after receiving a CTS sent from the STA1.

203. The AP then transmits a sounding frame to the STA1 in order to use the beam forming transmission to STA1 during the TXOP. Meanwhile the STA2 knows the AP is capable of full-duplex transmission and transmit beam forming from the received RTS frame. The STA2 may send a sounding frame to the AP during the time that AP is transmitting the sounding frame.

204. When the STA1 receives the sounding frame from the AP, it provides a feedback (such as ACK or other frame) to the AP. When the AP receives the sounding frame from STA2, it sends the feedback (such as ACK or other frame) to STA2 as well.

205. With the feedback information, the AP can steer its transmit beam at STA1 and STA2 can steer its transmit beam at the AP in following transmissions so as to establish spatial separation between the simplified STR frames. Similarly, the ST2 determines its transmission duration (T2), where T2 shall be less than the transmission time (T3) of PPDU(s) from the AP.

Figure 21:
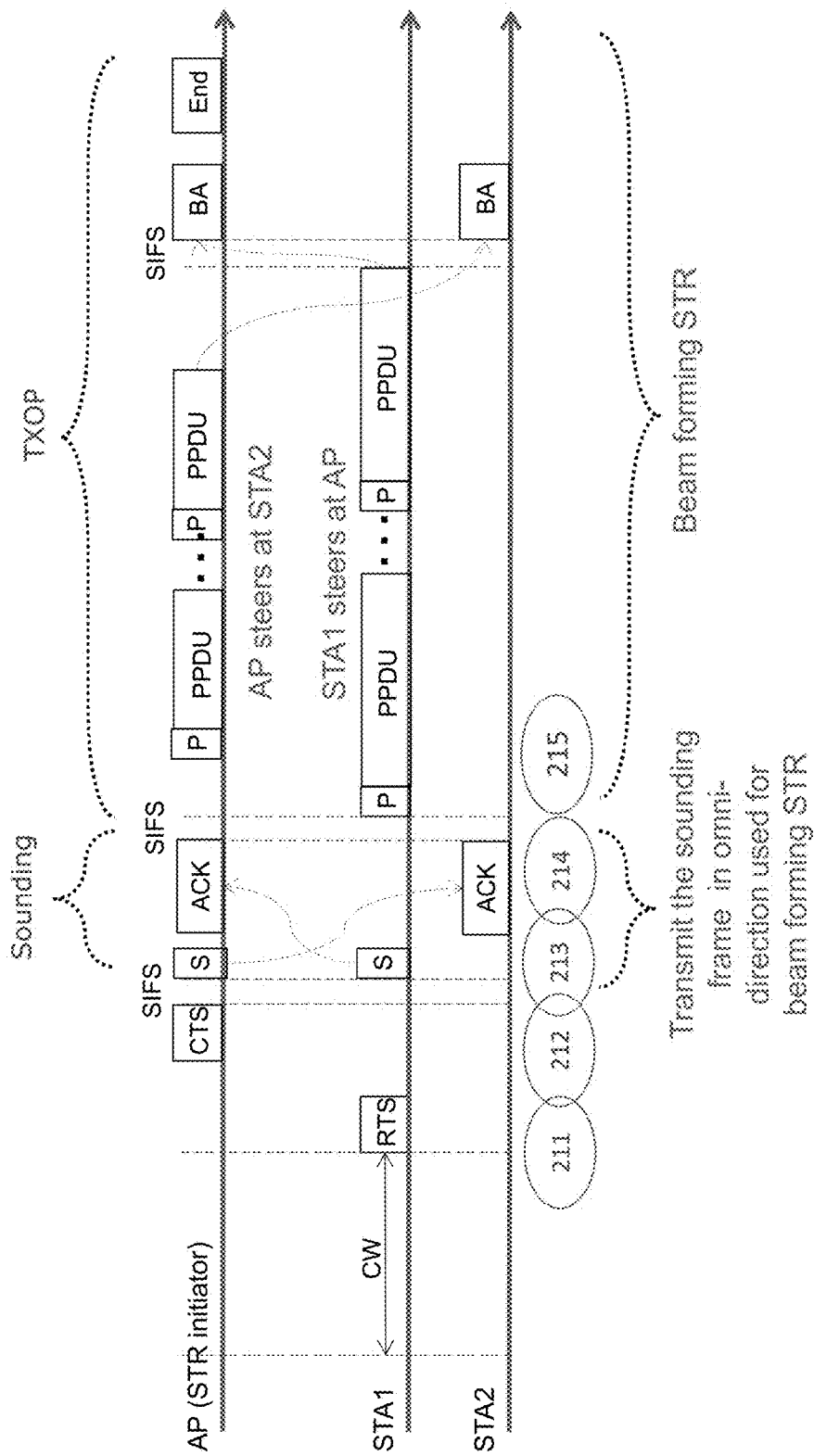
FIG. 21 shows an example of AP initiated simplified STR with beam forming option.

FIG. 21 shows an example of AP initiated simplified STR with beam forming option.

211. The STA1 contends the medium via transmitting a RTS with the transmit beam forming capability and duration information (T1) for transmitting PPDU(s) to the AP.

212. The full-duplex capable AP sends a CTS to the STA1 and indicates its full-duplex capability and transmit beam forming capability in the CTS.

213. Then STA1 sends a sounding frame to the AP after receiving the CTS frame. Meanwhile the AP sends a sounding frame to the STA2 which it has some buffered data for.

214. The STA2 sends a feedback frame (such as ACK) to the AP after it receives the sounding from the AP. At the same time, the AP sends the feedback frame (such as ACK) to the STA1 when it receives the sounding frame sent from the STA1.

215. With the feedback information, the AP can steer its transmit beam at the STA2, and the STA1 can steer its transmit beam at the AP in following transmissions to establish spatial separation in the simplified STR frames between the STA1 and the AP; and between the AP and the STA2. The AP determines the transmission duration (T2) of new connection from the duration (T1) field in ether RTS/CTS frame (i.e. T2<T1), or from the duration information (T3) in the SIG field of PPDU frame sent by STA1 (i.e. T2<T3).

Figure 22:
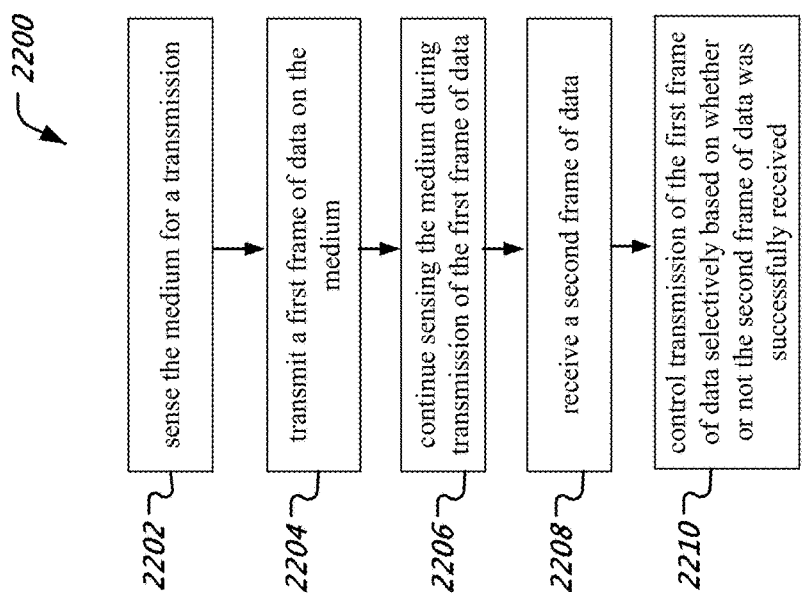
FIG. 22 is an example flowchart of a method for detecting and avoiding transmission collisions over a medium in a wireless communication system.

FIG. 22 is an example flowchart of a method 2200 for detecting and avoiding transmission collisions over a medium in a wireless communication system includes sensing (2202) the medium for a transmission, transmitting (2204), when no transmission is sensed on the medium, a first frame of data on the medium, continuing sensing (2206) the medium during transmission of the first frame of data, receiving (2208), when a transmission is sensed while transmitting the first frame of data, a second frame of data, and controlling (2210) transmission of the first frame of data selectively based on whether or not the second frame of data was successfully received. In some embodiments, the transmitting is performed using a transmit antenna and wherein the receiving is performed using a received antenna, and wherein the transmit antenna and the receive antenna are spatially isolated from each other.

In some implementations, a method for detecting and avoiding collisions over a medium in a wireless communication system includes sensing, in a first time interval, the medium for a transmission, when no transmission is sensed on the medium, transmitting, in a second time interval temporally after the first time interval, a first frame of data on the medium, continuing sensing the medium during transmission of the frame in the second time interval, when a transmission is sensed during the second time interval, then stopping transmission of the first frame of data.

In some implementations, a method of accessing a wireless channel in a full-duplex manner, the method implemented at a wireless station includes measuring a medium for idle status, transmitting, when the medium is idle, a request to send data frames over the medium, calibrating one or more radio parameters of the wireless station by measurements performed during the transmission of the request, wherein the one or more radio parameters are used for self-interference cancellation of a subsequent transmission from the wireless station, receiving a clear-to-send indication and transmitting a data frame based on the clear-to-send indication.

In some implementations, a wireless apparatus for performing full duplex operation in a wireless communication network includes a first antenna configured to transmit radio frequency (RF) signals over a medium and a second antenna configured to receive RF signals from the medium, the second antenna being isolated in space with respect to the first antenna. Some example antenna configurations are disclosed with respect to FIGS. 7 and 8.

Figure 23:
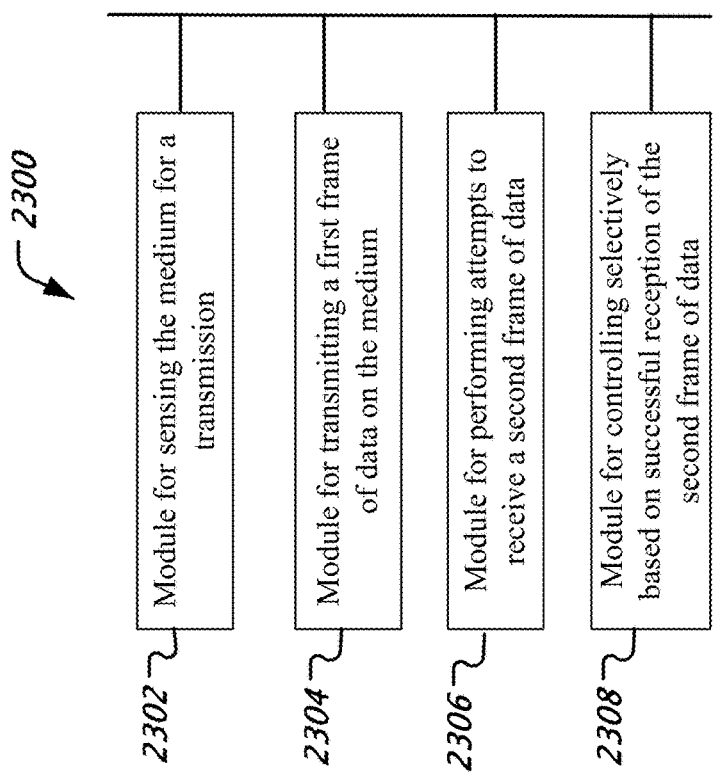
FIG. 23 depicts an example of a wireless communication device.

FIG. 23 depicts an example of a wireless communication device 2300. The module 2302 (e.g., a medium sensing module) is for sensing the medium for a transmission. The module 2304 (e.g., a transmitter module) is for transmitting, when no transmission is sensed on the medium, a first frame of data on the medium, wherein the medium sensing module continues sensing the medium during transmission of the first frame of data. The module 2306 (e.g., a receiver module) is for attempts, when a transmission is sensed while transmitting the first frame of data, to receive a second frame of data. The module 2308 (e.g., a transmission control module) is for controlling transmission of the first frame of data selectively based on whether or not the second frame of data was successfully received.

It will be appreciated that the present document discloses a technique to combine CSMA/CA mechanism with Collision Early Detection and Avoidance (CEDA) for channel access from multiple stations and full-duplex simultaneous DL and UL transmission in TXOP.

It will further be appreciated that the present document discloses a technique, called CEDA, for using full-duplexer to detect and avoid collision in early stage of transmission. Once the collision is detected, transmitting stations could fast release the medium for new contention, thereby minimizing wasting of medium availability.

It will further be appreciated that a technique for a full-duplexer to cancel self-interference using dual-layer antenna arrays for better cancellation performance is disclosed. In some implementations, a full-duplexer can calibrate radio parameters for RF and digital cancellation algorithms using the preamble as training sequence during the station's contending the medium. In some implementations, when the full duplexer is a responding station, it can calibrate radio parameters for RF and implement digital cancellation algorithms using the preamble in the response to the medium request.

It will further be appreciated that techniques are provided for operating a full-duplex AP station to schedule multiple pairs of DL and UL simultaneous transmissions. In some implementations, a full-duplex transmission mechanism can be used to mitigate the issue of hidden nodes in WLAN deployment. In some implementations, a full-duplex transmission mechanism may be implemented in a relay station to fast forward received packets to the next hop station to reduce the transmission latency.

It will further be appreciated that techniques are provided for operating a full-duplex AP station to schedule two pairs in the simplified simultaneous transmissions and receiving scenario, in which one pair communication is DL transmission while the other pair is UL transmission. In this way, the stations in the simplified simultaneous transmission and receiving scenario are only required to operate in the half duplex mode which will simplify the station's design and implement.

The disclosed and other embodiments, modules (e.g., a medium sensing module, a transmitter module, a receiver module, a transmission control module, etc.) and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method for detecting and avoiding transmission collisions over a medium in a wireless communication system, comprising:
   sensing the medium for a transmission;
   transmitting, when no transmission is sensed on the medium, a first frame of data on the medium;
   continuing sensing the medium during transmission of the first frame of data;
   receiving, when a transmission is sensed while transmitting the first frame of data, a second frame of data; and
   controlling transmission of the first frame of data selectively based on whether or not the second frame of data was successfully received.

2. The method of claim 1, wherein the transmitting is performed using a transmit antenna and wherein the receiving is performed using a receive antenna, and wherein the transmit antenna and the receive antenna are spatially isolated from each other.

3. The method of claim 1, further comprising:
   estimating, a contribution by the transmission of the first frame of data, to a received signal; and
   subtracting, from the received signal, the estimated contribution, to receive the second frame of data.

4. A method for detecting and avoiding collisions over a medium in a wireless communication system, comprising:
   sensing, in a first time interval, the medium for a transmission;
   when no transmission is sensed on the medium, transmitting, in a second time interval temporally after the first time interval, a first frame of data on the medium;
   continuing sensing the medium during transmission of the frame in the second time interval;
   when a transmission is sensed during the second time interval, then stopping transmission of the first frame of data.

5. The method of claim 4, wherein the transmitting is performed using a transmit antenna and wherein the receiving is performed using a received antenna, and wherein the transmit antenna and the receive antenna are spatially isolated from each other.

6. The method of claim 4, further comprising:
   estimating, a contribution by the transmission of the first frame of data, to a received signal; and
   subtracting, from the received signal, the estimated contribution, to receive the second frame of data.

* * * * *